May 4, 1943.  C. H. MILLER  2,318,514
INTERNAL COMBUSTION ROTARY ENGINE
Filed April 24, 1940    3 Sheets-Sheet 1
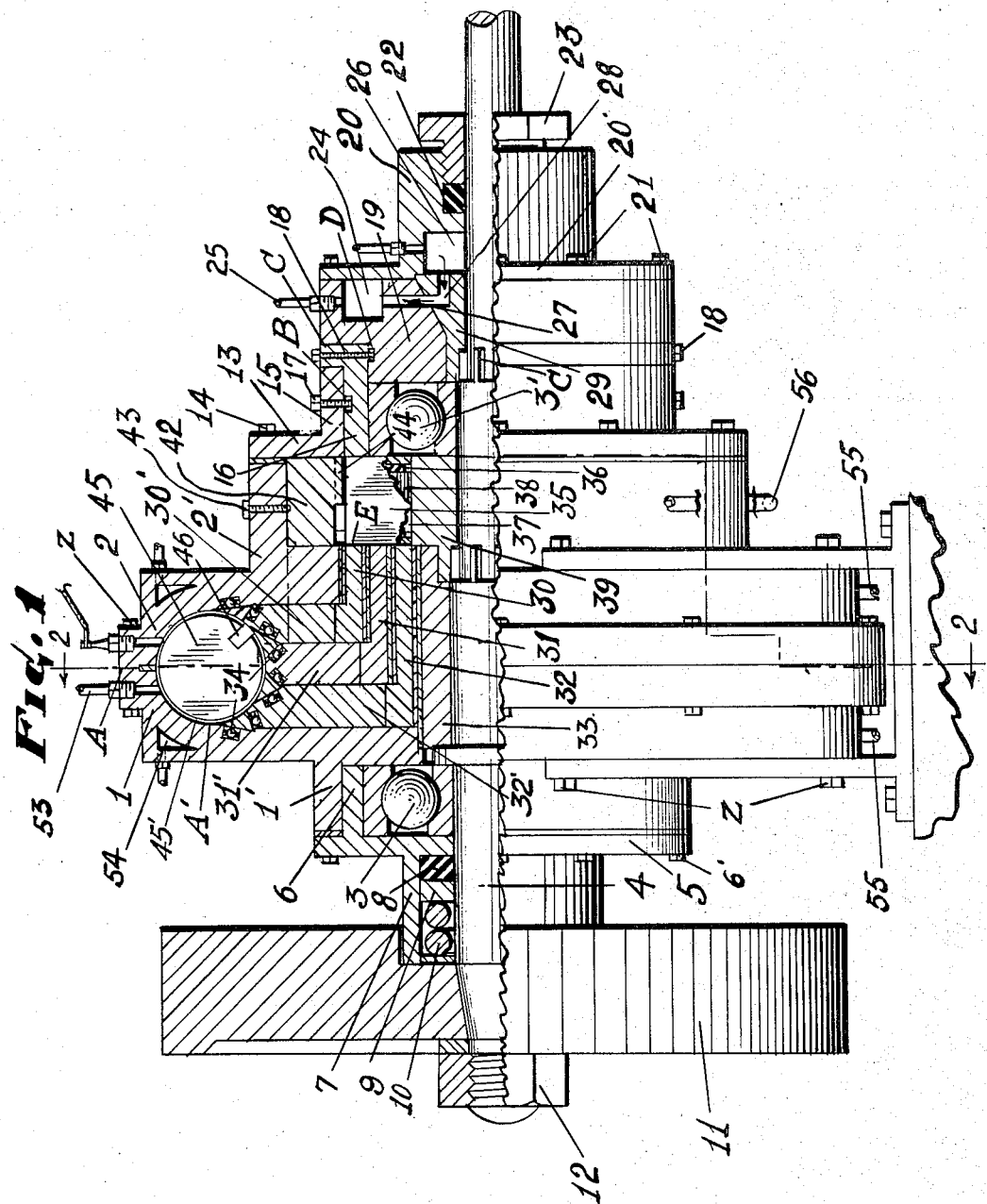
INVENTOR.
CLARENCE H. MILLER
BY
U. S. Charles
ATTORNEY.

May 4, 1943.    C. H. MILLER    2,318,514
INTERNAL COMBUSTION ROTARY ENGINE
Filed April 24, 1940    3 Sheets-Sheet 2
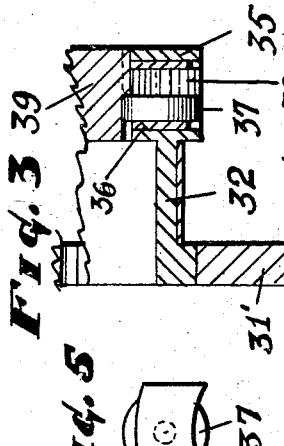
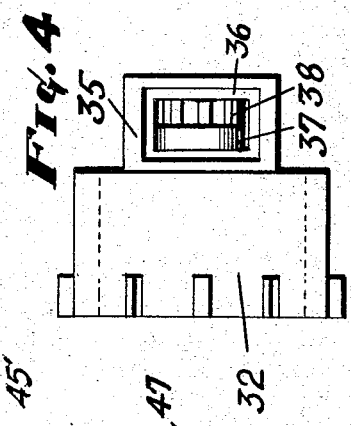
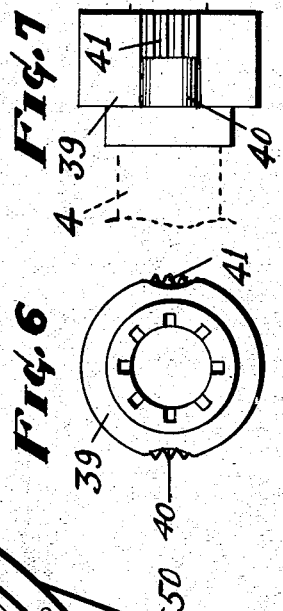
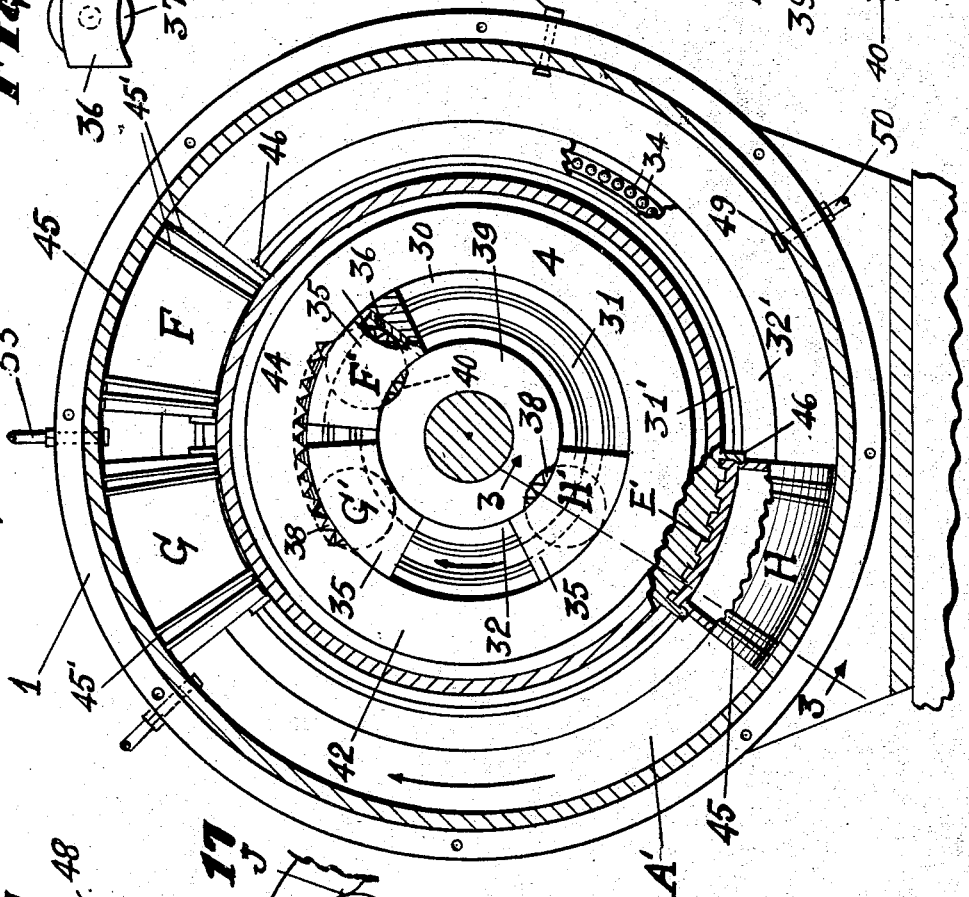
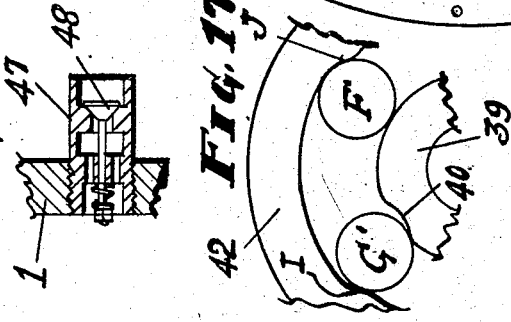
INVENTOR.
CLARENCE H. MILLER
BY
U. G. Charles
ATTORNEY.

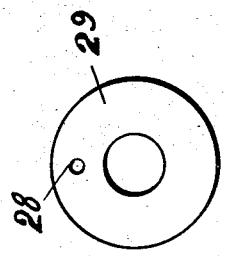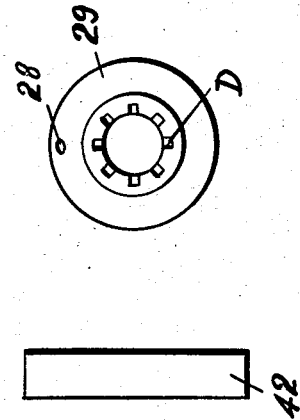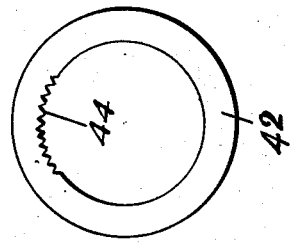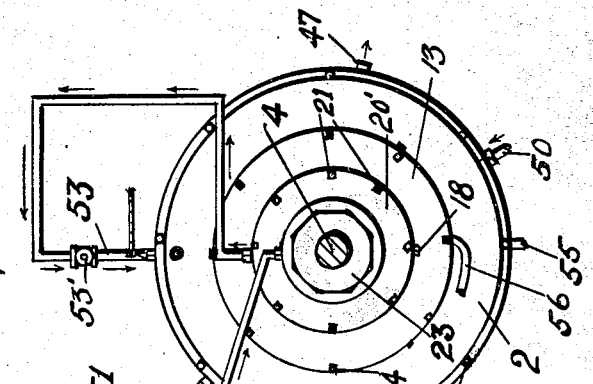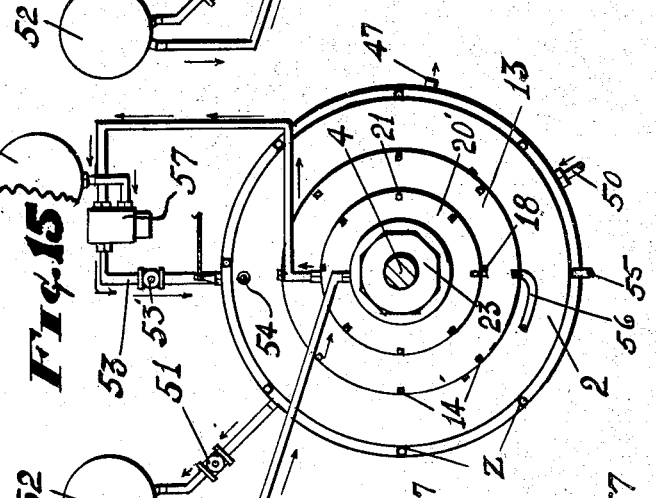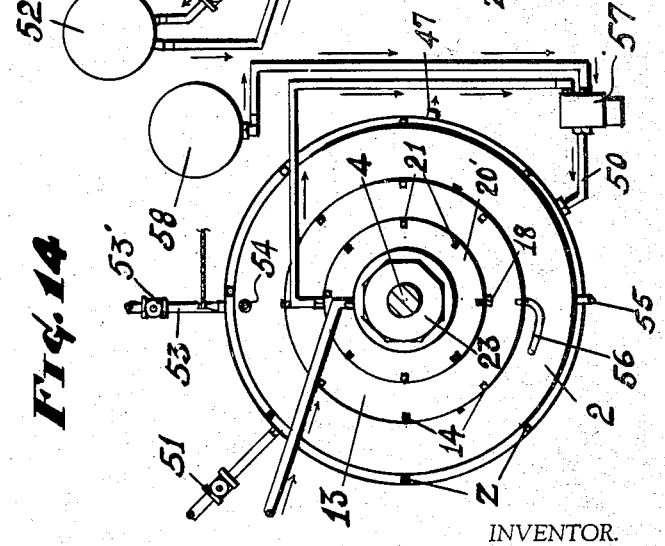

Patented May 4, 1943

2,318,514

UNITED STATES PATENT OFFICE 2,318,514

INTERNAL COMBUSTION ROTARY ENGINE

Clarence H. Miller, Winfield, Kans., assignor of twenty-five per cent to Allen L. Lipperd and five per cent to Ivan L. Lipperd, both of Winfield, Kans.

Application April 24, 1940, Serial No. 331,425

1 Claim. (Cl. 123—11)

My invention relates to improvements in internal combustion rotary engines and has for its principal object to impart rotary motion in a chosen direction at interval explosion of gaseous fuel, or by the introduction of high compression.

A further object of my invention is to produce an internal combustion rotary engine having an arcuate cylinder extending around a common center and sector pistons to circumnavigate the cylinder as power transmitting means to a shaft rotatably mounted axial with the said common center.

A still further object of my invention is to produce a rotary internal combustion engine, inexpensive to construct and efficient in its performance as a power transmission and furthermore, void of vibration during action of the engine.

These and other objects will hereinafter be more fully explained, reference being had to the accompanying drawings forming a part of this specification, in which like characters will apply to like parts in the different views.

Referring to the drawings:

Fig. 1 is a side view of the engine partly in section.

Fig. 2 is an axial sectional view taken on line 2—2 in Fig. 1, parts removed for convenience of illustration.

Fig. 3 is a fragmentary sectional view of one of the pistons, its sleeve and disc, as taken on line 3—3 in Fig. 2.

Fig. 4 is a side view of the sleeve structure, the disc and piston removed.

Fig. 5 is a side view of the pawl as the locking medium between a piston and the shaft.

Fig. 6 is an end view of the shaft rotary controlling detent.

Fig. 7 is a side view of the detent.

Fig. 8 is an enlarged sectional view of the exhaust valve.

Fig. 9 is a reduced axial end view of the outer pawl race wall.

Fig. 10 is a reversed end view of Fig. 9.

Fig. 11 is a side view of Figs. 9 and 10.

Fig. 12 is an inner end view of the fuel distributor.

Fig. 13 is an outer end view of the distributor.

Fig. 14 is an end view of the engine as arranged for combustible fuel.

Fig. 15 is an end view of the engine, illustrating a modified method for the introduction of fuel and compressed air.

Fig. 16 is an end view illustrating the engine operating under compression of air or steam.

Fig. 17 is a diagrammatic view, illustrating the position of the pawls prior to fuel explosion or compression otherwise, the teeth and block omitted.

My invention herein disclosed consists of a circular casing mounted on an appropriate base, said casing comprised of two members 1 and 2 subdivided at its center zone as at A and being secured together by bolts Z spaced therearound, the division being on the diametrical axis with respect to the cross section of an annular cylinder A' circumscribing the casing inward of its periphery. Member 1 has an annular outwardly extending rim 1' coaxial with the casing, functioning as a housing for a ball bearing 3 of a conventional type, and being retained in working relation to a drive shaft 4 by a head 5 having a flange 6 insertible in said rim 1' and secured by cap screws 6' to the outer end of said rim.

Axially extending from said head is a hub 7, in which is positioned an annular packing 8 secured by an annular washer 9 that is tensioned to snug engagement by a coil spring 10 seated in and adjacent the outer end of said hub, and wound about said shaft, said spring being retained therein by a fly wheel arrangement 11 that is axially bored to receive the end of the hub housed therein and drive shaft extending therethrough substantially as shown in Fig. 1, the fly wheel being secured to the shaft by a nut 12 threadedly engaging on the threaded end of said shaft.

It will be seen that member 2 has an outward extending annular rim 2' as a housing for the piston control elements later described, and the said annular rim being closed by a head 13 secured thereto by cap screws 14, the head having an annular flange 15 concentric to the axis of the shaft, functioning as a hub for a similar ball bearing 3' heretofore described, by which means, the said drive shaft is journaled in the casing, there being a bushing 16 inserted in the hub to snugly engage on the outer race of said bearing 3'. The said bushing has a groove B extending therearound externally and intermediate of its ends in which the end of a set screw 17 will seat, said screw threadedly engaging in the shell of said hub as binding means for the bushing against rotation, and the said bushing has a flange C outwardly extending at right angle and being bored and threaded at spaced intervals therearound to receive set screws 18 engaging therein, the inner end of which will seat in an annular groove D extending around member 19 of a distributor head, the other member 20 functioning as a hub through which the shaft extends and being secured by a plurality of cap screws 21 spaced around its flange 20' and made air tight by a packing 22 and a gland nut 23 threadedly engaging in the end of said hub.

Extending inward of the first named portion 19 of the distributor head is an annular groove 24 rectangular in cross section to function as a chamber for fuel, compressed air or steam, when the motor is actuated upon a selected principal, later described, and the said chamber having a supply pipe 25 communicating therewith as a conductor for said air, or other motive substance above mentioned, and the said chamber communicating with a similar chamber 26 positioned in the inner end of the hub, the communication being through the medium of a duct 27 extending inward to register at intervals with a duct 28 extending through a conical distributor 29 in communication with last said chamber, it being understood that the conical distributor is splined to the shaft at its inner end as shown as at C in Figs. 1 and 6, by which means the introduction of fuel to its combustion chamber in the cylinder is timed.

The method of transmitting torque to the said shaft is through the medium of a plurality of bushed sleeves 30, 31 and 32, nested together, surrounding a sleeve 33 secured to the said drive shaft, the ends of the sleeves as at E being aligned at right angles from the shaft while the other ends vary in length in consecutive order, each to receive a disc 30', 31' and 32', splined or otherwise secured thereon, the abutting faces of the discs adapted to closely engage with each other, and to avoid excess friction between the discs and casing walls there is positioned a series of ball bearings 34 appropriately formed and housing substantially as shown for smooth rotation of the discs individually or simultaneously. The periphery of each disc is arcuate with respect to cross section, the other portion of the cylinder formed in the casing all as shown in Fig. 1, whereby a smooth running fit is provided for pistons in their movement circumscribing the annular cylinder shown in Fig. 2.

The sleeves at their aligned ends, each have a hollow block 35 integrally secured thereto, the external end walls of which are trapezoidal in form, while the hollow is rectangular and being open at each end. Positioned in the hollow is a pawl element consisting of a rectangular cage 36, with open ends and in which is journaled a roller 37, the periphery of which has a series of teeth 38 spaced therearound, the teeth extending from one side to the center zone of the roller while the other portion is undisturbed and smooth, with a peripheral surface of the same diameter as the points of the teeth, and the said rectangular cage is adapted to slidably engage in the rectangular opening of the block, the movement of which is radially with respect to the turning axis of the shaft, and being carried by the block circumscribing a race, the race being annular and rectangular in cross section, the inner wall being a circular detent 39 functioning as a ratchet co-acting with the pawls. The said detent is secured to and rotatable with the shaft and has a pair of oppositely disposed arcuate depressions 40 crossing the periphery thereof, in which is positioned a series of gear teeth 41 extending outward from the arc, to be engaged by the teeth of the pawl roller, the teeth of the detent longitudinally extending from one side to the center zone of the circular portion thereof to function as a seat for the pawl, and being stationarily retained therein by an outer annular element 42 functioning as the outer pawl race wall, said wall being stationarily secured in the casing by a plurality of set screws 43 spaced therearound, it being understood that the diameter of the pawl roller is greater than the width of the race, being so arranged, the pawl as seated in the depression of the detent is turning means for the shaft and released therefrom as the pawl in its rotation reaches a series of teeth 44 depressed in the wall of said annular element 42, that correspond with the teeth and depressions in the detent element, at which instant of approach the pawl moves into engagement with the said teeth 44, releasing its grip from the detent as stationarily retaining means for its respective piston against retraction, and so on in consecutive order as the blocks circumscribe the race, the depression for the said teeth being equal to the arcuate depression in the detent whereby the pawl is released for the block function above stated.

Each of said discs has a piston 45 peripherally secured thereto, the pistons being arcuate to conform to the annular cylinder and being positioned on their discs in working relation with their respective pawl elements, each head of the said pistons being radially aligned with the shaft turning axis for convenience of the impact of fuel explosion, exerting its force uniformally on the head of the piston, and the said pistons being connected to their respective discs by notch engagement as shown at E' in Fig. 2, there being a lip 46 integral with the disc removably embedded in heads of each piston, by which means, the said pistons are removable, but retained against longitudinal movement at the instant of impact. There is also provided compression rings 45' adjacent each end of the piston whereby a smooth running air tight fit is acquired.

The annular cylinder is equipped with exhaust 47 having a check valve 48 to avoid retraction of fumes under a vacuum strain. Positioned a spaced distance onward from the exhaust is a fuel intake 49 having a pipe 50, as a connection with the annular air chamber 26 spaced from the fuel intake is a valve 51 adjustably arranged to open and close, when opened compression is built up in a tank 52 through its respective pipe connection, when the system of fuel supply is exercised as shown in Figs. 15 and 16, said systems later described. A pipe 53 connects with the annular cylinder as a feed supply for compressed air, steam, or fuel, later referred to.

In Fig. 1 is illustrated the position of a pair of annular openings 54 extending around the casing in parallelism with the cylinder as cooling means therefor by circulating air or liquid therethrough as injected and ejected through pipes 55 that connect with an appropriate radiator, the latter not shown in the drawings.

It will be understood that lubricant is introduced through a pipe 56 communicating with the pawl race and from thence between the sleeve and disc arrangement, communicating with the annular cylinder whereby the pistons are oiled, the circulation for which is built up by interval compression as abutting heads of the pawl block approach each other in their respective race.

The engine herein disclosed is provided with an efficient carbureter 57 and fuel tank 58 of appropriate types properly connected with the annular cylinder, also an efficient oil container for lubrication, (said container not shown in the drawings).

It will be seen that the engine has a circular cylinder through which a plurality of pistons move in consecutive order, and that each piston has a pawl element connected therewith, the pawl intermediately disposed between the pistons and the shaft, and each piston structure through the medium of its pawl automatically and alternately engages the shaft as rotatable means therefor, the said pawls circumscribing an annular race concentric to the annular cylinder, there being a detent ratchet element rotatable with the shaft, the periphery of which is the inside wall of the race, said shaft axially extending through the cylinder structure as a power transmission for the engine.

It will now be seen that different characters will be applied to the structure of the pistons and ratchet as a whole in describing the mode of operation as follows: In Fig. 2 is shown the relative position of the three pistons, F, G and H at the moment of fuel explosion, also the relative position of their respective pawls F', G' and H', it being understood that the corresponding pawl and piston are secured together through the medium of their respective sleeve and disc elements to move simultaneously.

As a means to accomplish the peak of fuel compression between pistons F and G as shown in Fig. 2 is through the medium of pawl F'' seated in the upper depression of the outer race wall while the detent carries with it piston G toward piston F, as its respective pawl G' is seated in the depression 40 of the said rotatable detent and when said pawl G' enters the said upper depression is means for its disengagement from its seat in the said rotatable detent, at which time, the seating depression will advance to engagement with pawl F'', and being so positioned the said pawl is free to advance in the race as shown in Fig. 2, at which instance through the medium of a spark plug flash, ignition of the fuel occurs, exerting its force of explosion between said pistons, forcing said piston F onward turning the shaft therewith while piston G is detained against retraction as seated in the upper depression, releasing its grip from the detent element and so on with respect to the next succeeding piston H in connection with piston G that is likewise detained momentarily for a repeated peak of compression, it being understood that the combusted fumes will exhaust from the cylinder as the said piston F passes the said exhaust port, at which instance, the conical distributor 29 and its head 19 will permit injection of air through the said intake port 49, said air being subjected to compression as a piston leaves the said intake port in its line of travel toward another position that is likewise detained.

The compulsory movement of the roller in the block is due to a moment of idleness of one of the pistons whereby compression is created by the approach of the next succeeding piston, and by continued rotation of the shaft the said one piston is released as the roller moves from the brink I in the upper depression, in which it is plunged by its displacement from its seat in the detent member movement which continues and receives the roller of pawl F' forcing it to seat in its approaching depression 40 whereby the roller is free to disengage from its detention shoulder J as a locking means to the detent member for repeated force to rotate the shaft, in other words the roller of each pawl element will momentarily loose its grip to turn the shaft in exchange for the roller approached to continue under the force of fuel ignition.

The engine thus designed will operate on compressed air or steam, in which instance the piping for such power control will be as illustrated in Fig. 16, in which case, the steam or compressed air will enter the cylinder through pipe 53 but controlled by the distributor, and in which event the internal fuel combustion is eliminated and valve 51 is closed.

Fig. 14 is an end axial view of the motor, its fuel pipes connecting to a fuel tank and carbureter, in this case, the fuel injection is controlled by the air passing through the distributor.

Fig. 15 illustrates a system of fuel conduction through pipe 53 introducing compressed air and fuel combined, the compressed air passing through the distributor and communicating with the carbureter that is supplied by ignitible fuel from a fuel tank and being checked by a valve 53'.

While I have shown and described a roller periphery toothed from its center zone to one side, the same may be divided at the center zone permitting each half to roll independent of the other, and such other modifications may be employed as lie within the scope of the appended claim.

Having fully described my invention what I claim as new and desire to secure by Letters Patent is:

A rotary internal combustion engine of the character described comprising a fixed casing having an annular cylinder formed therein, a plurality of pistons slidable in the cylinder, a drive shaft extending axially through the casing and concentric with the cylinder, intermittent driving means between the pistons and the shaft, said driving means comprising a plurality of sleeves of different lengths and concentric with the shaft, said sleeves nested together and rotatable one upon the other, one end of the sleeves being aligned while their opposite ends are provided with flanges, the outer or peripheral edges of the flanges being formed on an arc transversely and jointly forming one-half of the cylinder, anti-friction means between the sleeves and flanges, each of said flanges having a piston carried by its peripheral edge and rotatable therewith, means for securing the pistons to the flanges, a pawl carried by each of the sleeves at their aligned ends and in alignment with the respective piston carried on its flange, a ratchet member secured to and rotatable with the shaft, a fixed annular member carried by the casing and arranged concentric with the ratchet member in spaced relation, the ratchet and annular member jointly forming a raceway for said pawls, said pawls movable in the raceway under the action of the pistons and associated sleeves, a firing chamber formed by the pair of pistons, said pawls momentarily engaging the ratchet for holding one of the pistons against reverse movement to serve as an abutment while the co-acting piston and associated sleeve move under the influence of an explosive charge fired between the two pistons, the movement of the said co-acting piston transmitting its motion to the drive shaft through its sleeve and pawl, a charge igniting means arranged in the cylinder in advance of the abutment piston, means for introducing an explosive mixture between the pistons and exhaust means for the burned gases.

CLARENCE H. MILLER.